(12) United States Patent
Potter

(10) Patent No.: US 9,556,752 B2
(45) Date of Patent: Jan. 31, 2017

(54) STEAM TURBINE SYSTEM AND METHOD FOR STARTING UP A STEAM TURBINE

(71) Applicant: Siemens Aktiengesellschaft, Munich (DE)

(72) Inventor: Rudolf Potter, Essen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 196 days.

(21) Appl. No.: 14/386,797

(22) PCT Filed: Mar. 27, 2013

(86) PCT No.: PCT/EP2013/056546
§ 371 (c)(1),
(2) Date: Sep. 20, 2014

(87) PCT Pub. No.: WO2013/144217
PCT Pub. Date: Oct. 3, 2013

(65) Prior Publication Data
US 2015/0047354 A1 Feb. 19, 2015

(30) Foreign Application Priority Data
Mar. 28, 2012 (EP) ..................................... 12161657

(51) Int. Cl.
*F01K 13/02* (2006.01)
*F01D 19/00* (2006.01)
(Continued)

(52) U.S. Cl.
CPC ............... *F01K 13/02* (2013.01); *F01D 19/00* (2013.01); *F01K 7/16* (2013.01); *F01K 7/165* (2013.01); *F01K 7/40* (2013.01); *F02C 7/24* (2013.01)

(58) Field of Classification Search
CPC ............ F01D 19/00; F01K 13/02; F01K 7/16; F01K 7/165; F01K 7/40; F02C 7/24
See application file for complete search history.

(56) References Cited

U.S. PATENT DOCUMENTS 3,277,651 A 10/1966 Augsburger
4,445,180 A * 4/1984 Davis ...................... F01D 17/24
290/40 R
(Continued)

FOREIGN PATENT DOCUMENTS

CN 102449869 A 5/2012
DE 4432960 C1 11/1995
(Continued)

*Primary Examiner* — Jesse Bogue
(74) *Attorney, Agent, or Firm* — Beusse Wolter Sanks & Maire

(57) ABSTRACT

A steam turbine system including a steam turbine is provided, the steam turbine having an incoming and an outgoing steam side, and a turbine housing with a feed-through for a turbine shaft with a seal, whereby a fluid flow through the feed-through can be minimized, and a steam conducting system to the seal is present. The steam turbine includes a first sub-section a second sub-section, and a connecting line to a region of low pressure between two sub-sections. A steam supply through the steam conducting system is possible for starting up the steam turbine such that a steam flow from the outgoing steam side to the connecting line to the region of low pressure is possible, an incoming steam feed line has a shut-off that can be controlled such that a steam flow from the incoming steam side to the connecting line to the region of low pressure.

16 Claims, 3 Drawing Sheets

(51) Int. Cl.
 *F02C 7/24* (2006.01)
 *F01K 7/16* (2006.01)
 *F01K 7/40* (2006.01)

(56) References Cited

U.S. PATENT DOCUMENTS

| | | | |
|---|---|---|---|
| 4,651,532 A | 3/1987 | Abe | |
| 4,793,132 A * | 12/1988 | Okabe | F01D 19/00 |
| | | | 122/7 R |
| 4,793,141 A | 12/1988 | Asao | |
| 5,361,585 A | 11/1994 | Westphal et al. | |
| 5,473,898 A | 12/1995 | Briesch | |
| 2003/0159444 A1* | 8/2003 | Zimron | F01D 11/02 |
| | | | 60/650 |
| 2004/0201354 A1 | 10/2004 | Holden | |
| 2006/0254280 A1* | 11/2006 | Briesch | F01D 19/00 |
| | | | 60/772 |
| 2010/0202879 A1* | 8/2010 | Agara | F01D 11/005 |
| | | | 415/213.1 |
| 2011/0314817 A1* | 12/2011 | Zheng | F01D 3/02 |
| | | | 60/661 |
| 2012/0198845 A1* | 8/2012 | Maki | F01D 11/04 |
| | | | 60/653 |
| 2012/0324862 A1* | 12/2012 | Pandey | F01D 25/12 |
| | | | 60/39.182 |
| 2014/0047847 A1* | 2/2014 | Pasqualon | F01D 19/02 |
| | | | 60/778 |

FOREIGN PATENT DOCUMENTS

| | | |
|---|---|---|
| DE | 102008029941 A | 5/2009 |
| GB | 957024 A | 5/1964 |
| GB | 957371 A | 5/1964 |
| GB | 2176248 A | 12/1986 |
| GB | 2193764 A | 2/1988 |
| GB | 2453849 A | 4/2009 |
| GB | 2453849 B | 3/2010 |
| JP | S58-23208 A | 2/1983 |
| JP | S61237802 A | 10/1986 |
| JP | S63297705 A | 12/1988 |
| JP | 2002129907 A | 5/2002 |
| JP | 201108523 A | 4/2011 |
| SU | 1173049 A1 | 8/1985 |

* cited by examiner

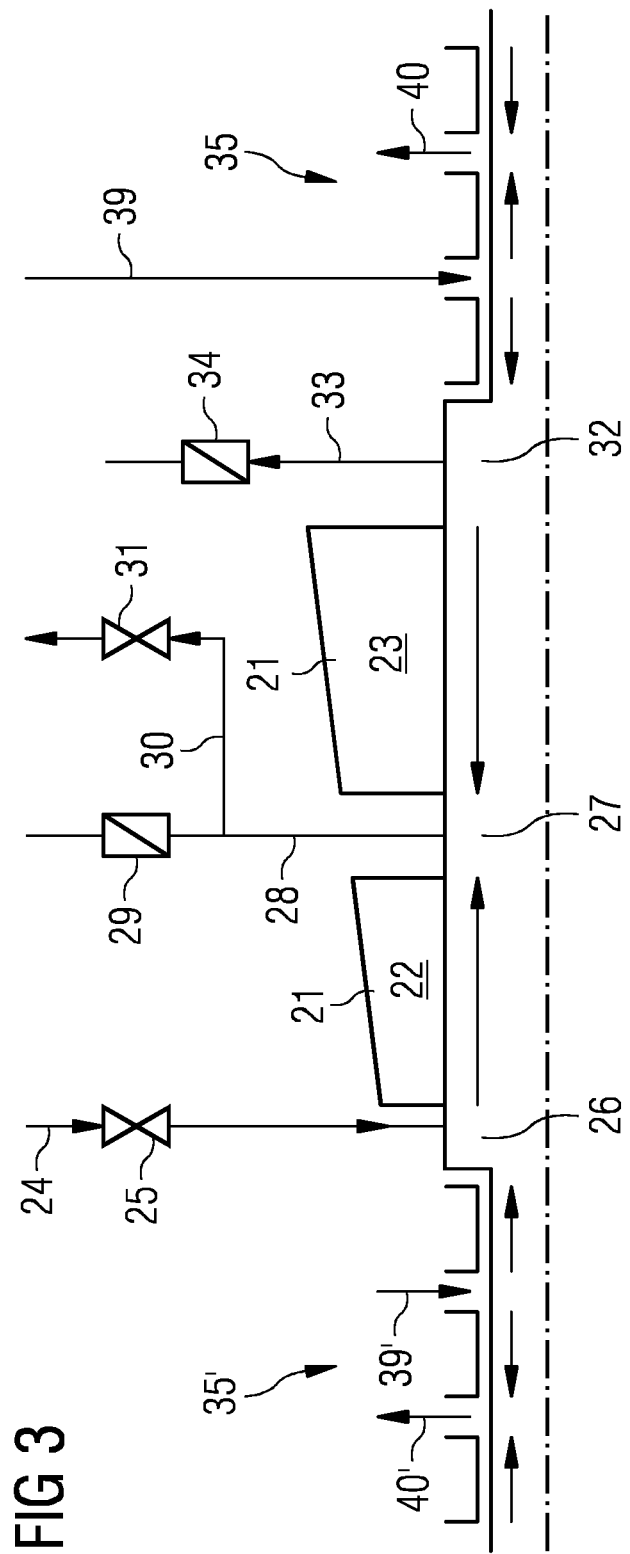

STEAM TURBINE SYSTEM AND METHOD FOR STARTING UP A STEAM TURBINE

CROSS REFERENCE TO RELATED APPLICATIONS

This application is the US National Stage of International Application No. PCT/EP2013/056546 filed Mar. 27, 2013, and claims the benefit thereof. The International Application claims the benefit of European Application No. EP12161657 filed Mar. 28, 2012. All of the applications are incorporated by reference herein in their entirety.

FIELD OF INVENTION

The invention relates to a steam turbine system in which the starting up of a steam turbine is improved. The invention furthermore relates to an associated method.

BACKGROUND OF INVENTION

When starting up steam turbines in thermal power stations, the mechanical power is initially limited, since the generator cannot be sufficiently synchronized and operated under load during the starting-up operation. The energy contained in the steam is therefore converted into mechanical work only in a smaller portion than in the normal power mode. This lower extraction of energy resorts in a reduced cooling of the steam as the steam passes through the steam turbine. Significantly higher temperatures than in the normal power mode therefore occur particularly in that region of the steam turbine in which the steam emerges, i.e. in the outgoing steam region. This is true particularly if the losses inside the steam turbine fall if, for example, the low pressure turbine is not in operation.

These higher temperatures necessitate a costly design to guard against said temperatures. In order to avoid the higher temperatures, the following measures have previously been proposed and realized. Firstly, what is referred to as trimming is known. In a system having a high pressure turbine, a medium pressure turbine and a low pressure turbine with resuperheating, the high temperatures occur predominantly in the high pressure outgoing steam and in the low pressure outgoing steam. In order to reduce the temperature in the low pressure outgoing steam, water is injected, i.e. water is additionally supplied to the steam. The temperature is therefore kept within permissible limits. The high pressure outgoing steam temperature is restricted by the mass flow through the high pressure section being increased. At the same time, the mass flow through the medium pressure section and the low pressure section is reduced. The increased pressure ratio in the high pressure section reduces the high pressure outgoing steam temperature. The reduced pressure ratio in the medium pressure section and low pressure section increases the ventilation power in the low pressure section and compensates for the increased power in the high pressure section.

If it does not suffice to reduce the temperature in the high pressure section to the desired extent, the outgoing steam chamber of the high pressure turbine is connected to the condenser by a starting-up line. A nonreturn valve to the cold resuperheating thereby closes and therefore there is no steam extraction point from the high pressure turbine into the resuperheating. The lower pressure level results in a lower high pressure outgoing steam temperature.

In a further approach to reducing the temperature, the mechanical power of the generator is increased. In more precise terms, the generator is intended to supply electrical power as early as in the starting-up mode, i.e. at low and continuously increasing rotational speeds, at which synchronization is not possible. This generated electrical power cannot be output to the mains because of the lack of synchronization. Electric heating elements are therefore provided for using the current generated. The heat generated in the heating elements can be connected into the preheating section of the water steam circuit and used for preheating the feed water.

SUMMARY OF INVENTION

It is an object of the invention to provide a steam turbine system and an associated method for starting up a steam turbine, with which the thermal problems during the starting-up operation can be overcome in a simple manner.

An object of the invention is achieved in particular by the independent patent claims. The dependent patent claims specify advantageous refinements.

In order to achieve an object of the invention, a steam turbine system having the following features is proposed: the steam turbine system has a steam turbine with an incoming steam side, an outgoing steam side, and a turbine housing. The turbine housing has a feed-through for a turbine shaft. A seal is present in said feed-through. The seal here is generally a labyrinth seal. The seal is intended to minimize a fluid flow, i.e. normally a steam flow, through the feed-through. A steam conducting system leads to the seal. The steam turbine is constructed from at least one first sub-section and at least one second sub-section, and a connecting line to a region of low pressure, in particular to a condenser of a thermal power plant, is present between the two sub-sections. The low pressure is understood here as meaning a pressure which is so significantly below the pressure of the steam turbine that, when the connecting line is opened, steam flows from the steam turbine into said region. It is generally appropriate for there to be a connecting line to the condenser. For the feed-through facing the outgoing steam side of the steam turbine, the steam conducting system is designed in such a way that a steam supply to the steam turbine through the steam conducting system is possible for starting up the steam turbine. A steam flow from the outgoing steam side to the connecting line to the region of low pressure can therefore take place for starting up the steam turbine. An incoming steam feed line has a shut-off which can be controlled in such a way that a steam flow from the incoming steam side to the connecting line to the region of low pressure is possible for starting up the steam turbine.

The incoming steam side is the side on which steam is supplied to the steam turbine in the normal power mode. In a high pressure turbine, it is the side on which the live steam coming from a steam generator (not described specifically here) is supplied. In a medium pressure turbine, it is the steam originating from resuperheating. The outgoing steam side is correspondingly the side on which the steam emerges from the steam turbine in the power mode. These terms will be kept to within the scope of this depiction even if, according to aspects of the invention, steam is specifically supplied on the outgoing steam side for the starting-up operation.

One aspect of the invention makes it possible to supply steam from the steam conducting system via the seal. Steam having a lower temperature than the temperature of the live steam or of the resuperheating steam can therefore be selected. The problem, which is explained at the beginning, of the high temperatures in the region in the vicinity of the outgoing steam side during the starting-up operation is therefore avoided. When the steam flows from the outgoing steam side to the connecting line to the region of lower pressure, mechanical work cannot be performed, since the steam flows counter to the direction customary in the power mode. No energy which is worth mentioning and which would lead to cooling of the steam is therefore extracted from the steam. On the contrary, the "ventilation" results in an increase of the temperature. The temperature therefore rises in the steam turbine from the outgoing steam side as far as the region between the turbine sections. A temperature profile which at least qualitatively corresponds to the temperature profile in the power mode is therefore set in the steam turbine.

The incoming steam feed line is normally a live steam line in the high pressure turbine, and normally a resuperheating steam line in the medium pressure turbine. The controllable valves in the incoming steam feed line generally involve a live steam valve or a resuperheating valve.

In one embodiment, the steam conducting system has an intermediate extraction line and/or a locking steam line and/or a water vapor line. During the operation of the steam turbine a significantly higher steam pressure prevails in the turbine housing than outside the turbine housing. The turbine shaft has to be able to rotate in the feed-through in as contact-free a manner as possible. Therefore, a seal providing a complete seal between the turbine shaft and the feed-through for the turbine shaft in the turbine housing cannot be used. A labyrinth seal is normally used as the seal. For this purpose, internals are provided in the feed-through on the turbine housing, said internals reaching for a distance into the feed-through, i.e. reducing the diameter of the feed-through at certain points. Surface-mounted components which increase the diameter of the turbine shaft at certain points are present on the turbine shaft. The internals and surface-mounted components are generally thin plates. The turbine shaft is arranged in such a manner that the surface-mounted components fastened to the turbine shaft project into the space between the internals. The turbine shaft can therefore rotate freely. The steam—in a greatly reduced quantity of steam because of the effect of the seal—flows through the feed-through, i.e. past the internals and the surface-mounted components, because of the higher steam pressure in the turbine housing than in the surroundings of the turbine housing. In the process, the steam pressure of the turbine housing drops in the direction of the surroundings. In order to minimize losses, the steam is extracted in the different regions of the seal and is used at another location in the thermal power station. In that region of the seal which is in the vicinity of the inner region of the turbine housing, there is an intermediate extraction line leading to the intermediate extraction system, in the case of a high pressure turbine. In the case of the medium pressure turbine, an intermediate extraction line is normally not present. Further on the outside, the locking steam is extracted via a locking steam line. The water vapor is extracted via the water vapor line in a region of the seal that is located far on the outside, i.e. in the direction of the region outside the turbine housing. Said steam conducting system can then also be used, according to an aspect of the invention, to supply steam on the outgoing steam side of the steam turbine, as set forth above.

The connecting line to the region of low pressure is preferably attached to, for example flange-mounted on, a steam extraction point. The steam extraction point is in any case located in that region of the steam turbine which is desired for the connecting line. It is therefore possible to avoid further internals directly on the steam turbine.

In one embodiment, there is an auxiliary steam line with which auxiliary steam can be supplied to the intermediate extraction line. Since the intermediate extraction line leads into an intermediate extraction system, normally for the outgoing steam of the low pressure turbine, there should be the possibility of separating the intermediate extraction line from the intermediate extraction system so that the auxiliary steam does not flow off into the intermediate extraction system, but rather is available for the steam supply via the seal.

In one embodiment, there are control devices in order, for the starting, to bring about the desired steam flow from the outgoing steam side to the connecting line to the region of low pressure and the desired steam flow from the incoming steam side to the connecting line to the region of low pressure. This generally includes the fact that valves, such as the live steam valve and the resuperheating steam valve, have to be correspondingly controllable in the incoming steam feed line and that there are corresponding control devices. Similarly, correspondingly controllable valves are required in the steam conducting system to the seal. Furthermore, the pressure should be ascertained at various locations in the steam turbine system in order to be able to determine the corresponding steam flows. By means of the apparatuses described, a substantially automated starting up of the steam turbine can be made possible.

An embodiment of the invention also relates to a thermal power plant comprising the steam turbine system described above. Such a thermal power plant can be started up in a simple manner and is therefore available for the increasingly required operation with a multiplicity of, and optionally rapid, power increases.

Another embodiment of invention also relates to a method for starting up a steam turbine. This particularly involves a method for starting up a steam turbine in a steam turbine system described above. In order to avoid repetition in the description, reference is substantially made to the descriptions regarding the steam turbine system, in which references are already contained to the corresponding method. The method for starting up the steam turbine has the following steps: first of all, the steam turbine is evacuated. A central region of the steam turbine is then connected to a region of low pressure, in particular to a condenser. Steam is then supplied via a seal, which seals off a turbine shaft from a turbine housing. Steam can therefore be supplied to the steam turbine on an outgoing steam side. Similarly, a metered supply of incoming steam on an incoming steam side of the steam turbine takes place in order to achieve a desired rotational speed and/or acceleration and/or power. During the abovementioned measures, it should be ensured that a desired steam flow flows at the same time from the outgoing steam side to the central region of the steam turbine. If, for example, too much steam were to be supplied, then an excessively high pressure would be set in the central region of the steam turbine despite the provided connecting line, and therefore the steam flow from the outgoing steam side to the central region would be undesirably reduced. In this case, either the incoming steam supply should be throttled and/or more steam should be supplied on the outgoing steam side via the seal. If a desired power of the steam turbine is reached, the supply of steam via the seal is ended and the central region of the steam turbine is separated from the region of low pressure. For this purpose, a valve in the connecting line to the region of low pressure is generally closed. The flow, which is customary in the power mode, through the steam turbine from the incoming steam side to the outgoing steam side is then produced. The rising pressure in the steam turbine also causes a nonreturn valve in a steam extraction point to open, and therefore, as is customary in the power mode of a thermal power plant, some of the turbine steam is used at a different location.

The steam turbine can be evacuated, as described above, by connecting the central region of the steam turbine to the region of low pressure. The steps of evacuating the steam turbine and connecting the central region of the steam turbine to the region of low pressure are therefore basically a single step.

In one refinement of the method, in particular if the method involves the starting up of a high pressure turbine, in order to supply steam via the seal, first of all an intermediate extraction line is separated from an intermediate extraction system, i.e. the connection to the outgoing steam of a medium pressure turbine is thus normally separated. Auxiliary steam is then supplied via the intermediate extraction line, and therefore the steam can flow into the seal and from there to the outgoing steam side of the steam turbine.

Alternatively, optionally also additionally, auxiliary steam is not supplied into the intermediate extraction line, but rather locking steam is supplied via a locking steam supply. In this case, the intermediate extraction line is likewise separated from the intermediate extraction system. Steam can also be supplied to the steam turbine on the outgoing steam side via the locking steam supply. For this purpose, normally the desired pressure is set in a locking steam chamber, and therefore steam flows through the locking steam line.

As already mentioned, live steam can be used as the incoming steam for a high pressure turbine. It has likewise already been explained that steam from resuperheating is preferably used as the incoming steam for a medium pressure turbine.

The connection of the central region of the steam turbine to the region of low pressure preferably takes place via a shut-off unit in a line which connects an extraction point to the condenser. There is therefore no need to provide a further line on the cramped steam turbine. It is possible to produce a connection to the condenser via the extraction point. By means of a shut-off unit, this connection can be opened when desired, as described, during the starting-up operation and can otherwise remain closed.

In a variant of the method for starting up a steam turbine, before the evacuation of the steam turbine, the entire steam turbine is subjected to a steam treatment with locking steam or with auxiliary steam supplied via the intermediate extraction line. A moderate first preheating can therefore take place. The subjection to steam treatment with auxiliary steam via the intermediate extraction means is generally possible only in the case of high pressure turbines.

In order to ensure the steam supply via the locking steam supply in a desired manner, a desired pressure can be set in the locking steam chamber. The desired steam flow takes place in this manner.

BRIEF DESCRIPTION OF THE DRAWINGS

Details of embodiments of the invention are described once again in detail with reference to the following figures, in which:

FIG. 3 shows the design of a medium pressure turbine, in which locking steam is used for the starting-up operation.

DETAILED DESCRIPTION OF INVENTION

Figure 1:
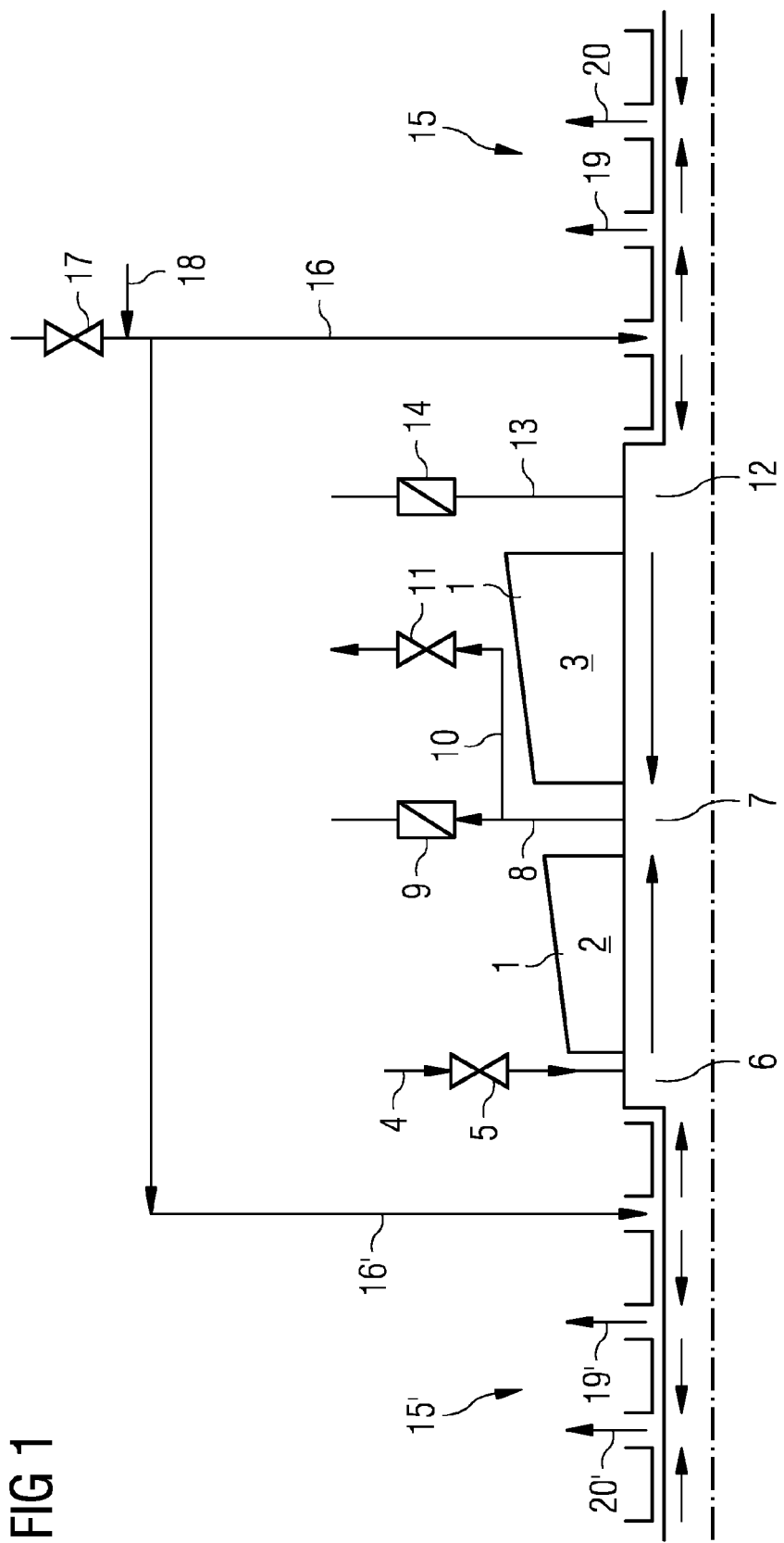
FIG. 1 shows the design of a high pressure turbine, in which auxiliary steam is supplied via the intermediate extraction line for the starting-up operation.

FIG. 1 illustrates a steam turbine 1, wherein a high pressure turbine is involved here. The latter has a first turbine section 2 and a second turbine section 3. A live steam line 4, in which a live steam valve 5 is arranged, leads as an incoming steam feed line to the first turbine section 2. Steam can therefore be supplied in a metered manner to an incoming steam side, or live steam side 6, of the high pressure turbine 1. An extraction point 8 is attached to a central region 7 of the high pressure turbine 1, i.e. to the region between the first turbine section 2 and the second turbine section 3. The extraction point 8 leads via a nonreturn valve 9 to a preheater (not illustrated). The nonreturn valve 9 prevents steam from flowing out of the preheater into the high pressure turbine 1 through the extraction point 8. A connecting line 10, frequently called starting-up line, is attached to the extraction point 8. By means of a connecting valve 11 which is installed in the connecting line 10, the connection to a condenser (not illustrated) is produced or separated as required. An outgoing steam side 12 is located in a region next to the second turbine section 3. An outgoing steam line 13 leads from said outgoing steam side to an outgoing steam nonreturn valve 14. A seal 15 which minimizes the steam flow from a turbine housing into the surroundings is connected to the outgoing steam side 12 of the high pressure turbine 1 on the side facing away from the turbine section 3. An intermediate extraction line 16 leading into the seal 15 can be seen. The intermediate extraction line 16 can be shut off by an intermediate extraction valve 17. Auxiliary steam can be supplied to the intermediate extraction line 16 via an auxiliary steam line 18. In addition to the intermediate extraction line 16, first of all a locking steam line 19 and, further on the outside, a water vapor line 20, through which locking steam or water vapor can emerge, are connected to the seal 15. It is pointed out for the sake of completeness that there is a further seal 15' on the live steam side 6 of the high pressure turbine 1. An intermediate extraction line 16', a locking steam line 19' and a water vapor line 20' are also arranged there.

In order to start up the high pressure turbine 1, the following procedure should be selected: first of all, the intermediate extraction valve 17 should be closed in order to subject the system to a steam treatment. The high pressure turbine 1 with the first turbine section 2 and the second turbine section 3 is then subjected to a steam treatment with auxiliary steam which is introduced into the intermediate extraction line 16 via the auxiliary steam line 18. Also via the intermediate extraction line 16', steam flows to the high pressure turbine 1 via the seal 15'. A first preheating of the high pressure turbine 1 therefore takes place. The connecting valve 11 in the connecting line 10 is then opened. The high pressure turbine 1 with the first turbine section 2 and the second turbine section 3 is therefore evacuated. Steam can therefore flow from the central region 7 of the high pressure turbine 1 via the extraction point 8 into the connecting line 10 to the condenser. A desired amount of auxiliary steam is then supplied at a certain pressure via the auxiliary steam line 18 in order to achieve a desired pressure ratio between the outgoing steam side 12 and the central region 7 of the high pressure turbine 1. This results in a steam flow, which is illustrated by the arrow, through the second turbine section 3 from the outgoing steam side 12 to the central region 7. By means of a metered opening of the live steam valve 5, the desired quantity of steam flows to the live steam side 6 via the live steam line 4. Furthermore, a desired steam flow through the first turbine section 2, as illustrated by the arrow, then occurs between the live steam side 6 and the central region 7. The steam flow through the first turbine section 2 and the steam flow through the second turbine section 3 combine in the central region 7 and then flow together into the extraction point 8 and from there via the connecting line 10 to the condenser. The desired rotational speed and/or acceleration and/or power in the first turbine section 2 can be set via the opening of the live steam valve 5. It is therefore also possible for the pressure ratio between the outgoing steam side 12 and the central region 7 to obtain the desired value. The desired steam flow through the second turbine section 3 is therefore ensured. As soon as the minimum power is reached in the first turbine section 2, the auxiliary steam supply via the auxiliary steam line 18 is ended. The intermediate extraction valve 17 is opened. The connecting valve 11 in the connecting line 10 is closed. The pressure in the high pressure turbine 1 therefore increases. This furthermore leads to the nonreturn valve 9 to the resuperheating opening automatically because of the pressure. The normal power mode, in which live steam is supplied on the live steam side 6 by the live steam line 4, is therefore initiated. The steam then flows through the first turbine section 2 and the second turbine section 3 to the outgoing steam side 12 and further through the outgoing steam line 13 via the then open outgoing steam nonreturn valve 14. Some of the steam is extracted from the central region 7 via the extraction point 8 and flows via the open nonreturn valve 9 to the preheater (not illustrated). It should be explained in addition that some steam escapes in the locking steam lines 19, 19' and the water vapor lines 20, 20' during the starting-up operation, since a higher pressure is provided via the intermediate extraction lines 16, 16'.

Figure 2:
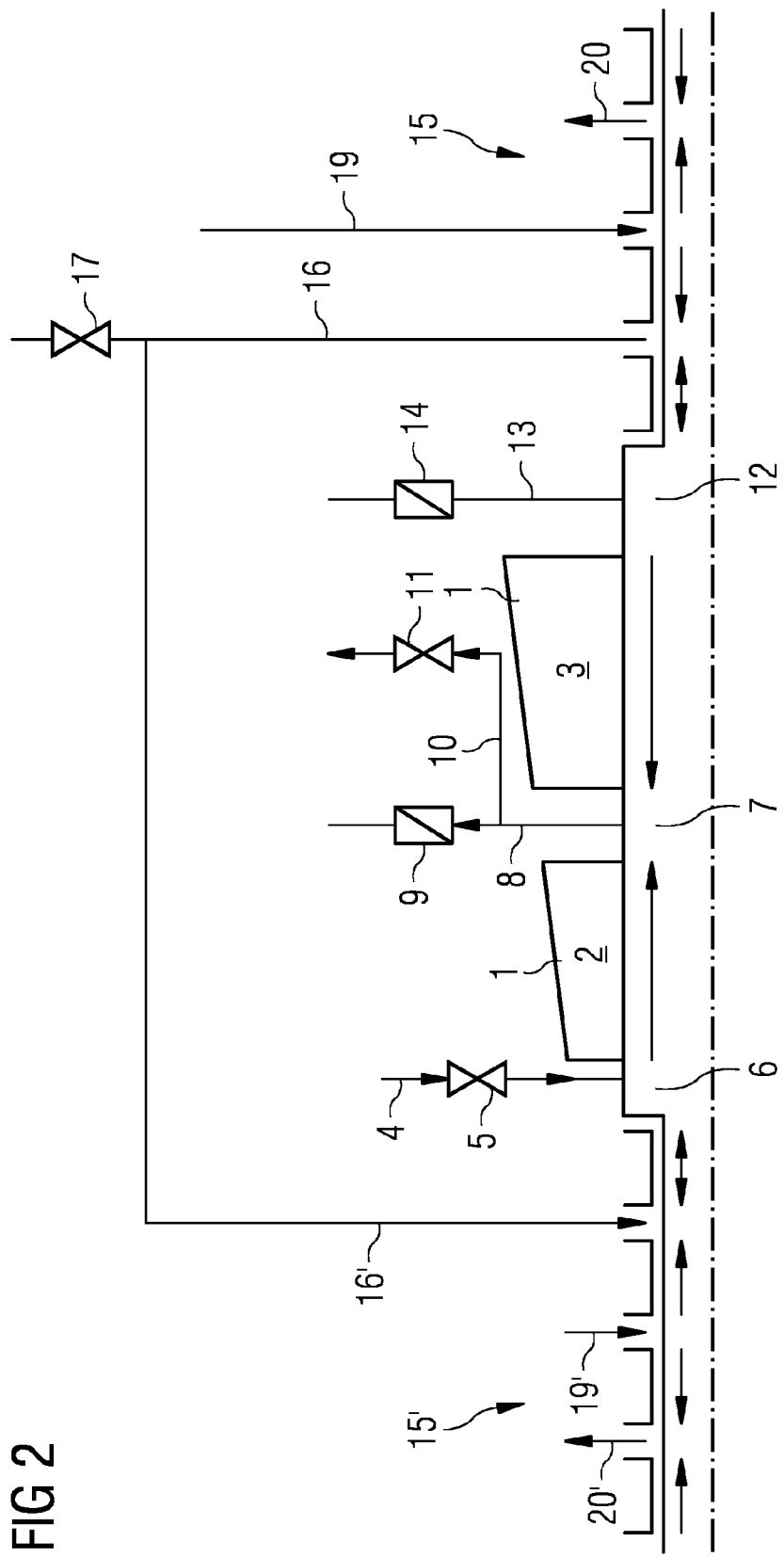
FIG. 2 shows the design of a high pressure turbine, in which locking steam is used for the starting-up operation.

A further possibility for starting up the high pressure turbine 1 is now illustrated. For this purpose, increased locking steam pressure is used. As can be seen, the design of FIG. 2 virtually corresponds to that of FIG. 1. Identical features are not explained again in order to avoid repetitions. The sole difference is that there is no auxiliary steam line 18 for the supply of the intermediate extraction line 16 and that the steam flow in the locking steam lines 19, 19' has a different direction during the starting-up operation. The method for starting up the high pressure turbine 21 is also relatively similar. At the beginning, the intermediate extraction valve 17 should also be closed. The turbine sections 2 and 3 are then subjected to a steam treatment via the locking steam lines 19 and 19'. All of the remaining steps and procedures are identical. Admittedly, in order to set the pressure on the outgoing steam side 12, it is not the auxiliary steam supply 18, but rather correspondingly the pressure in a locking steam supply which is to be set. For this purpose, the pressure in a locking steam chamber (not illustrated) is correspondingly selected. The starting up of a medium pressure turbine is illustrated below with reference to FIG. 3. A medium pressure turbine 21 can be seen in FIG. 3. It has a first turbine section 22 and a second turbine section 23. Steam originating from resuperheating is introduced into the medium pressure turbine 21 through a resuperheating steam line 24 serving as the incoming steam feed line. In order to regulate the steam flow, a resuperheating valve 25 installed in the resuperheating steam line 24 serves as a controllable shut-off. In the power mode, the steam flows to an incoming steam side 26, which can also be called the resuperheating steam side here. In the power mode, pressure is removed through the first turbine section 22 and subsequently through the second turbine section 23. A central region 27 of the medium pressure turbine 21 is located between the turbine sections 22 and 23. An extraction point 28 leads through a nonreturn valve 29 to a second preheater (not illustrated). The nonreturn valve 29 prevents flow back from the preheater through the extraction point 28 into the medium pressure turbine 21 at too low a pressure in the medium pressure turbine 21. A connecting line 30, also called starting-up line, leads from the extraction point 28 to the condenser. In the connecting line 30 there is a connecting valve 31 with which the connecting line 30 can be connected to, and separated from, the condenser. In the normal power mode, the steam flows from an outgoing steam side 32 of the medium pressure turbine into an outgoing steam line 33 and through an outgoing steam nonreturn valve 34 to a second resuperheating. A region of a seal 35 is connected to the outgoing steam side 32 of the medium pressure turbine 21. An intermediate extraction line is not connected to the seal 35 because of the lower pressure in the medium pressure turbine 21 in comparison to the high pressure turbine 1. As in the high pressure turbine 1, a locking steam line 39 and a water vapor line 40 are also connected to the seal 35 in the case of the medium pressure turbine 21.

In order to start up the medium pressure turbine 21, the procedure is then as follows: first of all, the medium pressure turbine 21 with the first turbine section 22 and the second turbine section 23 is subjected to a steam treatment with blocking steam which originates from the line 39. An evacuation then takes place by opening of the connecting valve 31 in the connecting line 30 to the condenser. By setting a desired pressure in the locking steam chamber, a desired pressure ratio between the outgoing steam side 32 and the central region 27 of the medium pressure turbine 21 is produced. A desired steam flow is therefore initiated. In a similar manner as when starting up the high pressure turbine 1, the resuperheating valve 25 is easily opened, and therefore steam flows through the resuperheating steam line 24 from the first resuperheating (not illustrated) into the incoming steam side 26. The steam flows from there through the first turbine section 22 to the central region 27. The resuperheating valve 25 is opened in such a manner that a desired rotational speed and/or acceleration and/or power of the medium pressure turbine 21, more precisely the first turbine section 22, is achieved. When a minimum power is achieved, the connecting line 30 is separated from the condenser by the connecting valve 31 being closed. The pressure in the medium pressure turbine 21 therefore rises rapidly. As a result, the nonreturn valve 34 opens. The flow passes correctly through the first turbine section 22 and the second turbine section 23 of the medium pressure turbine 21 with limited ventilation. The two turbine sections 22 and 23 are also referred to as drums 22 and 23.

For the sake of completeness, it is also indicated that a seal 35' is connected to the incoming steam side 26'. Said seal seals off the turbine housing from the turbine shaft on the incoming steam side 26. Accordingly, a locking steam line 39' and a water vapor line 40' can also be seen here. At the beginning of the above-described starting up of the medium pressure turbine 21, steam also flows correspondingly through the locking steam line 39' to the medium pressure turbine 21'. As soon as steam flows via the resuperheating steam line 24 to the incoming steam side 26 and therefore the pressure rises there, the steam flow flowing through the seal 35' via the locking steam line 39' to the incoming steam side 26 is certainly very low or equal to zero.

Although embodiments of the invention have been illustrated and described in more detail by an exemplary embodiment, the invention is not restricted by the examples disclosed and other variations can be derived therefrom by a person skilled in the art without departing from the scope of protection of the invention.

The invention claimed is:

1. A steam turbine system comprising:
a steam turbine comprising an incoming steam side, an outgoing steam side, and a turbine housing, wherein the turbine housing comprises a first feed-through opening on a the incoming side for a turbine shaft, a first seal disposed in the first feed-through opening and around the turbine shaft, a second feed-through opening on the outgoing steam side for the turbine shaft, and a second seal disposed in the second feed-through opening and around the turbine shaft;
a steam supply line providing a fluid communication pathway suitable for conducting steam to the first seal; and
a controller;
wherein the steam turbine comprises at least one first sub-section and at least one second sub-section, and a connecting line providing fluid communication from a central region inside the steam turbine and between adjacent first and second sub-sections to a region of low pressure disposed external to the steam turbine;
wherein, during starting up the steam turbine, the controller establishes a reverse steam flow from the steam supply line to the outgoing steam side, from an outlet to an inlet of the at least one second sub-section, to the central region to the connecting line to the region of low pressure takes place; and
wherein an incoming steam feed line in fluid communication with the incoming steam side is controlled by the controller during start UP to create a forward steam flow from the incoming steam feed line to the incoming steam side to the central region to the connecting line to the region of low pressure for starting up the steam turbine while the reverse flow flows.

2. The steam turbine system as claimed in claim 1, wherein the steam supply line comprises at least one of an intermediate extraction line in fluid communication with the first seal and a locking steam line in fluid communication with the first seal and a water vapor line in fluid communication with the first seal.

3. The steam turbine system as claimed in claim 1, wherein the connecting line to a region of low pressure is attached to a steam extraction point.

4. The steam turbine system as claimed in claim 1, wherein the steam supply line comprises an intermediate extraction line in fluid communication with the first seal, the steam turbine further comprising an auxiliary steam line configured to supply auxiliary steam to the intermediate extraction line.

5. A thermal power plant comprising a steam turbine system as claimed in claim 1.

6. The steam turbine system as claimed in claim 1, further comprising a condenser comprising the region of low pressure.

7. The steam turbine system as claimed in claim 1, wherein the connecting line is flange-mounted on a steam extraction point that is in fluid communication with the central region.

8. A method for starting up a steam turbine, said steam turbine comprising a turbine housing and a turbine shaft, said method comprising:
evacuating the steam turbine by providing fluid communication between a central region of the steam turbine and a region of low pressure disposed external to the steam turbine;
supplying steam to the steam turbine through a first seal that is disposed between the turbine shaft and the turbine housing on an outgoing steam side of the steam turbine, wherein by supplying the steam a controller establishes a reverse steam flow that flows in a reverse direction through the steam turbine, from the first seal to the outgoing steam side to the central region and then to the region of low pressure;
providing a metered supply of incoming steam to an incoming steam side of the steam turbine in order to achieve at least one of a desired rotational speed, acceleration, and power;
ending the reverse steam flow and ending the fluid communication between the central region of the steam turbine and the region of low pressure when a desired power of the steam turbine is reached.

9. The method as claimed in claim 8, wherein, in order to supply steam through the first seal, an intermediate extraction line in fluid communication with the first seal is placed in fluid communication with a supply of auxiliary steam that is supplied to the first seal.

10. The method as claimed in claim 8, wherein, in order to supply steam through the first seal, an intermediate extraction line in fluid communication with the first seal is closed and locking steam is supplied to the first seal via a locking steam line that is in fluid communication with the first seal.

11. The method as claimed in claim 8, wherein the steam turbine comprises a high pressure turbine, the method further comprising using live steam as the incoming steam for the high pressure turbine.

12. The method as claimed in claim 8, wherein the steam turbine comprises a medium pressure turbine, the method further comprising using steam from resuperheating as the incoming steam for the medium pressure turbine.

13. The method as claimed in claim 8, wherein the central region of the steam turbine is connected to the region of low pressure via a shut-off unit in a connecting line, wherein the connecting line connects an extraction point that is in fluid communication with the central region to a condenser comprising the region of low pressure.

14. The method as claimed in claim 8, wherein the steam turbine is subjected to a steam treatment with at least one of locking steam supplied to the first seal via an intermediate extraction line in fluid communication with the first seal and auxiliary steam supplied to the first seal via the intermediate extraction line before evacuating the steam turbine.

15. The method as claimed in claim 8, wherein a locking steam line supplies the steam to the first seal, the method further comprising setting a desired locking steam pressure in a locking steam chamber.

16. The method as claimed in claim 8, wherein the central region of the steam turbine is in fluid communication with a condenser comprising the region of low pressure.

* * * * *